(12) United States Patent
Bakhsh et al.

(10) Patent No.: US 7,828,321 B2
(45) Date of Patent: Nov. 9, 2010

(54) INFLATABLE SIDE CURTAIN THAT MOVES OCCUPANT'S HEAD AWAY FROM VEHICLE SIDE STRUCTURE

(75) Inventors: Ali Emam Bakhsh, Rochester Hills, MI (US); Russell E. Stein, Houghton, MI (US); Ayad G. Nayef, Sterling Heights, MI (US); Kevin J. Boxey, Columbiaville, MI (US)

(73) Assignee: TRW Vehicle Safety Systems, Inc., Washington, MI (US)

( * ) Notice: Subject to any disclaimer, the term of this patent is extended or adjusted under 35 U.S.C. 154(b) by 270 days.

(21) Appl. No.: 11/053,469

(22) Filed: Feb. 8, 2005

(65) Prior Publication Data

US 2006/0082107 A1  Apr. 20, 2006

Related U.S. Application Data

(63) Continuation-in-part of application No. 09/963,618, filed on Sep. 26, 2001, now Pat. No. 6,851,707, which is a continuation-in-part of application No. 09/946,287, filed on Sep. 5, 2001, now Pat. No. 6,431,590, which is a continuation of application No. 09/672,547, filed on Sep. 28, 2000, now abandoned.

(51) Int. Cl.
*B60R 21/213* (2006.01)

(52) U.S. Cl. .................................. 280/730.2

(58) Field of Classification Search .............. 280/730.2
See application file for complete search history.

(56) References Cited

U.S. PATENT DOCUMENTS

| | | | |
|---|---|---|---|
| 3,731,949 A | 5/1973 | Radke | |
| 5,338,060 A * | 8/1994 | Soderquist | ............... 280/728.3 |
| 5,427,410 A | 6/1995 | Shiota et al. | |
| 5,439,247 A | 8/1995 | Kolb | |
| 5,524,924 A | 6/1996 | Steffens, Jr. et al. | |
| 5,588,672 A | 12/1996 | Karlow et al. | |
| 5,615,908 A * | 4/1997 | Phillion et al. | ............ 280/728.3 |
| 5,630,612 A * | 5/1997 | Yamamoto et al. | ........ 280/728.2 |
| 5,681,051 A * | 10/1997 | Phillion | .................... 280/728.3 |
| 5,730,463 A | 3/1998 | Fisher et al. | |
| 5,788,270 A | 8/1998 | Haland et al. | |
| 5,865,462 A | 2/1999 | Robins et al. | |
| 5,884,937 A | 3/1999 | Yamada | |
| 5,899,490 A | 5/1999 | Wipasuramonton et al. | |
| 5,899,491 A | 5/1999 | Tachaeschke | |
| 5,924,723 A | 7/1999 | Brantman et al. | |

(Continued)

FOREIGN PATENT DOCUMENTS

DE  4134995  3/1993

(Continued)

*Primary Examiner*—Paul N. Dickson
*Assistant Examiner*—Joselynn Y. Sliteris
(74) *Attorney, Agent, or Firm*—Tarolli, Sundheim, Covell & Tummino LLP (57) ABSTRACT

Apparatus (10) helps protect an occupant (152) of a vehicle (12) that has a side structure (16) and a roof (18). The apparatus (10) includes a vehicle occupant protection device (14) deployable away from the vehicle roof (18) into engagement with the occupant's head (150) positioned against the side structure (16) to move the occupant's head laterally away from the side structure.

25 Claims, 7 Drawing Sheets

U.S. PATENT DOCUMENTS

| | | | |
|---|---|---|---|
| 5,957,487 A | 9/1999 | Stutz | |
| 5,960,611 A | 10/1999 | Aigner et al. | |
| 5,984,348 A | 11/1999 | Specht et al. | |
| 6,010,149 A | 1/2000 | Riedel et al. | |
| 6,032,977 A | 3/2000 | Reh et al. | |
| 6,056,316 A | 5/2000 | Yamaji et al. | |
| 6,073,961 A | 6/2000 | Bailey et al. | |
| 6,082,761 A | 7/2000 | Kato et al. | |
| 6,135,492 A | 10/2000 | Zimmerbeutel et al. | |
| 6,142,506 A * | 11/2000 | Patel et al. | 280/728.2 |
| 6,149,185 A * | 11/2000 | White et al. | 280/728.2 |
| 6,155,596 A | 12/2000 | Nakajima et al. | |
| 6,168,191 B1 | 1/2001 | Webber et al. | |
| 6,170,860 B1 | 1/2001 | Denz et al. | |
| 6,179,324 B1 | 1/2001 | White, Jr. et al. | |
| 6,186,534 B1 | 2/2001 | Heinz | |
| 6,199,898 B1 | 3/2001 | Masuda et al. | |
| 6,217,061 B1 * | 4/2001 | Harland et al. | 280/730.2 |
| 6,220,625 B1 | 4/2001 | Wallner et al. | |
| 6,224,087 B1 | 5/2001 | Stutz et al. | |
| 6,224,091 B1 * | 5/2001 | Eyrainer et al. | 280/730.2 |
| 6,231,072 B1 * | 5/2001 | Pywell et al. | 280/730.2 |
| 6,234,517 B1 * | 5/2001 | Miyahara et al. | 280/730.2 |
| 6,237,937 B1 | 5/2001 | Kokeguchi et al. | |
| 6,237,943 B1 | 5/2001 | Brown et al. | |
| 6,244,619 B1 | 6/2001 | Satzger | |
| 6,250,668 B1 | 6/2001 | Breed et al. | |
| 6,312,010 B1 | 11/2001 | Heigl | |
| 6,325,410 B1 * | 12/2001 | Eyrainer | 280/730.2 |
| 6,334,626 B2 | 1/2002 | Nakajima et al. | |
| 6,364,349 B1 | 4/2002 | Kutchey et al. | |
| 6,394,487 B1 | 5/2002 | Heudorfer et al. | |
| 6,435,544 B1 * | 8/2002 | Brucker | 280/730.2 |
| 6,626,456 B2 | 9/2003 | Terbu et al. | |
| 6,793,241 B2 * | 9/2004 | Wallner et al. | 280/730.2 |
| 2002/0024203 A1 * | 2/2002 | Takahashi | 280/730.2 |
| 2002/0158450 A1 | 10/2002 | Hoeft et al. | |
| 2004/0251663 A1 * | 12/2004 | Heigl et al. | 280/730.1 |

FOREIGN PATENT DOCUMENTS

| | | |
|---|---|---|
| DE | 4307175 | 9/1993 |
| DE | 19743626 | 4/1998 |
| DE | 29914637 | 1/2000 |
| GB | 2314300 | 12/1997 |

* cited by examiner

INFLATABLE SIDE CURTAIN THAT MOVES OCCUPANT'S HEAD AWAY FROM VEHICLE SIDE STRUCTURE

RELATED APPLICATIONS

This application is a continuation-in-part of U.S. patent application Ser. No. 09/963,618, filed Sep. 26, 2001, which is a continuation-in-part of U.S. patent application Ser. No. 09/946,287, filed Sep. 5, 2001, which is a continuation of U.S. patent application Ser. No. 09/672,547, filed Sep. 28, 2000, now abandoned.

FIELD OF THE INVENTION

The present invention relates to an apparatus for helping to protect an occupant of a vehicle in the event of a side impact to the vehicle and/or a vehicle rollover.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable curtain that inflates from the roof of the vehicle downward inside the passenger compartment in the event of a side impact or a vehicle rollover. The inflatable curtain, when inflated, is positioned between a vehicle occupant and the side structure of the vehicle. A known inflatable curtain is inflated by inflation fluid directed from an inflator into the inflatable curtain through a fill tube.

SUMMARY OF THE INVENTION

The present invention relates to an apparatus for helping to protect an occupant of a vehicle. The apparatus includes a vehicle occupant protection device deployable away from a roof of the vehicle into engagement with the occupant's head positioned against a side structure of the vehicle to move the occupant's head laterally away from the side structure.

The present invention also relates to an apparatus for helping to protect an occupant of a vehicle. The apparatus includes an inflatable vehicle occupant protection device inflatable to deploy away from a roof of the vehicle to a position between a side structure of the vehicle and the vehicle occupant. The apparatus also includes an inflation fluid source for providing inflation fluid for inflating the protection device. The apparatus further includes a deflector for directing the protection device to deploy toward a target location on the vehicle side structure. The target location is selected to cause the protection device to engage the occupant's head positioned against the side structure and move the occupant's head laterally away from the side structure. The protection device inflates between the side structure of the vehicle and the occupant's head.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF EMBODIMENTS

As representative of the present invention, an apparatus 10 helps to protect an occupant of a vehicle 12. As shown in FIGS. 1A-3B, the apparatus 10 includes an inflatable vehicle occupant protection device in the form of an inflatable curtain 14 that is mounted adjacent the side structure 16 of the vehicle 12 and a roof 18 of the vehicle. The roof 18 may be either a standard roof that is fixed in place or a convertible roof that can be moved or removed. The side structure 16 of the vehicle 12 includes side windows 20. An inflator 24 is connected in fluid communication with the inflatable curtain 14 through a fill tube 22.

The fill tube 22 has a portion, disposed in the inflatable curtain 14, with a plurality of openings (not shown) that provide fluid communication between the fill tube 22 and the inflatable curtain 14. The inflator 24 is actuatable to provide inflation fluid for inflating the inflatable curtain 14 and maintaining the curtain in an inflated condition for a desired duration, such as at least five seconds.

The inflator 24 may contain a stored quantity of pressurized inflation fluid (not shown) in the form of a gas for inflating the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid. As a further alternative, the inflator 22 could be of any suitable type or construction for supplying a medium for inflating the inflatable curtain 14 and maintaining the curtain in an inflated condition for at least five seconds.

The apparatus 10 includes a housing 26 that stores the inflatable curtain 14 in a deflated condition. The fill tube 22, the deflated inflatable curtain 14, and housing 26 have an elongated configuration and extend along the vehicle roof 18 and along the side structure 16 of the vehicle 12 above the side windows 20. The housing 26 may have a variety of constructions. For example, the housing 26 may comprise a fabric sheath or a plastic housing.

Figure 1A:
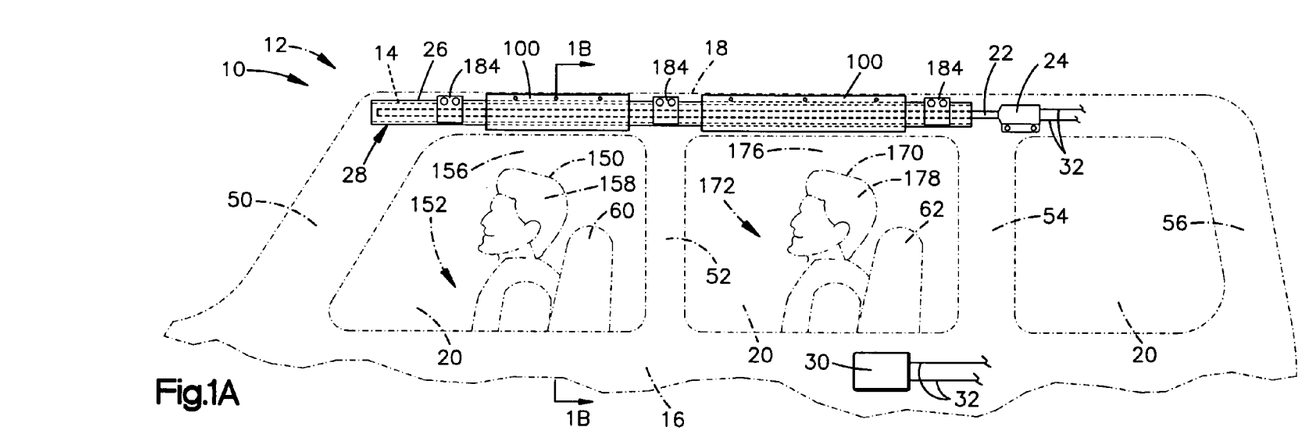
FIG. 1A is a schematic view of an apparatus for helping to protect a vehicle occupant illustrating the apparatus in a deflated and stored condition, according to a first embodiment of the invention.
Figure 1B:
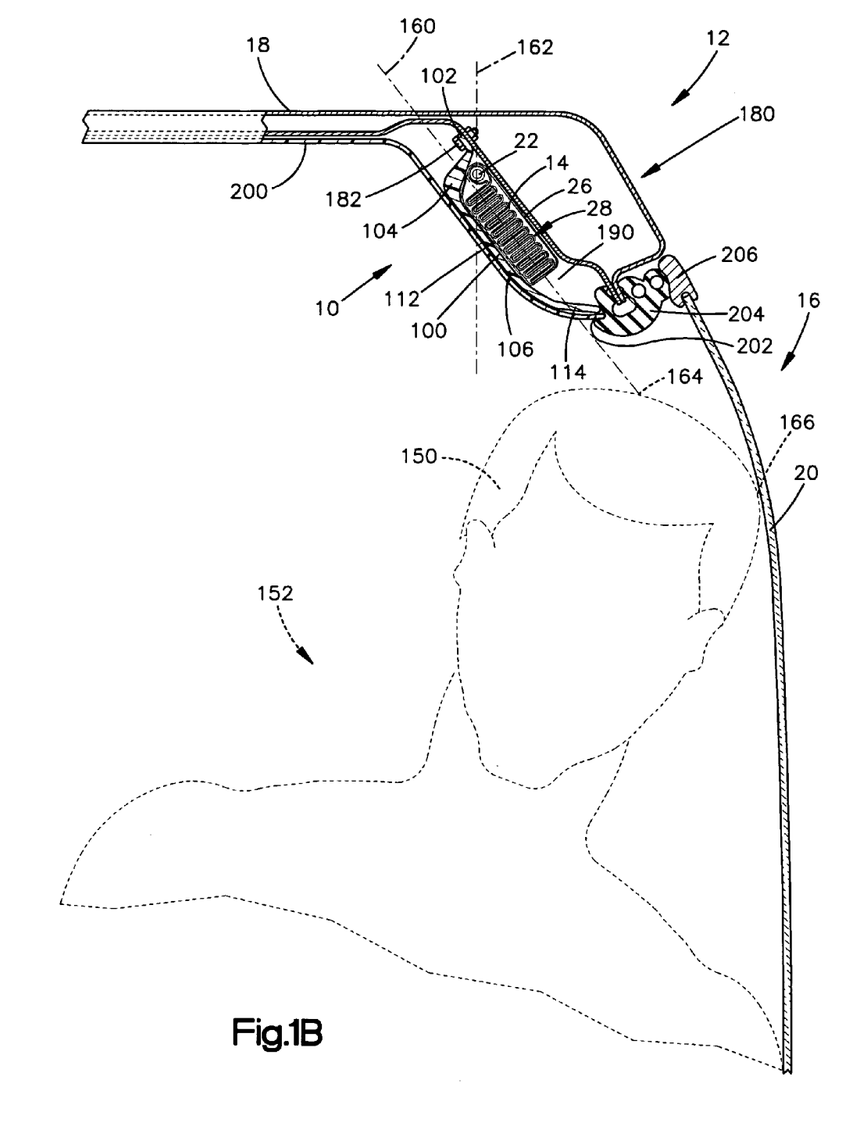
FIG. 1B is a sectional view taken generally along line 1B-1B in FIG. 1A.
Figure 6A:
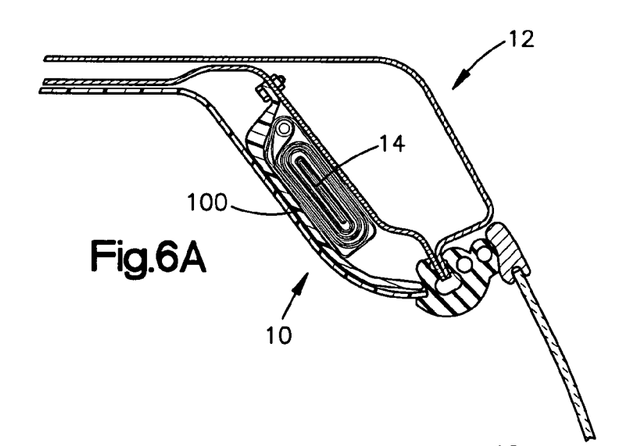
FIGS. 6A-6D are sectional views illustrating alternative configurations for the deflated and stored condition of the apparatus.
Figure 6B:
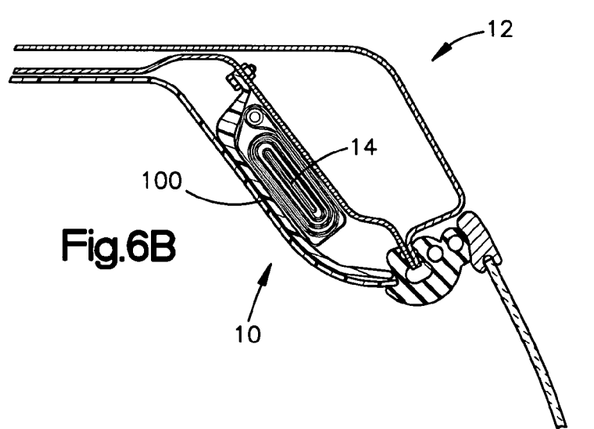
Figure 6C:
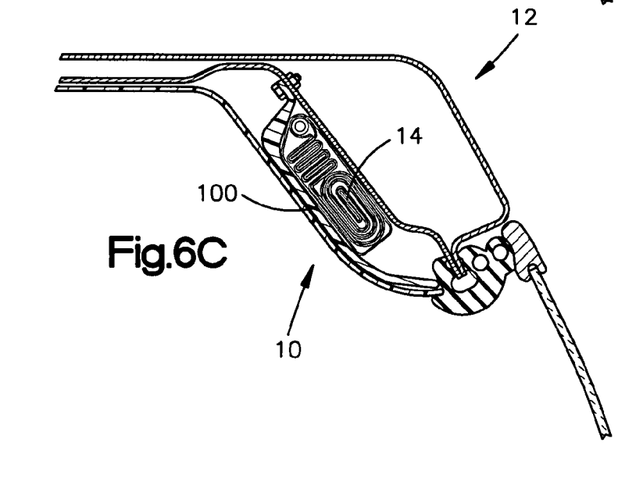
Figure 6D:
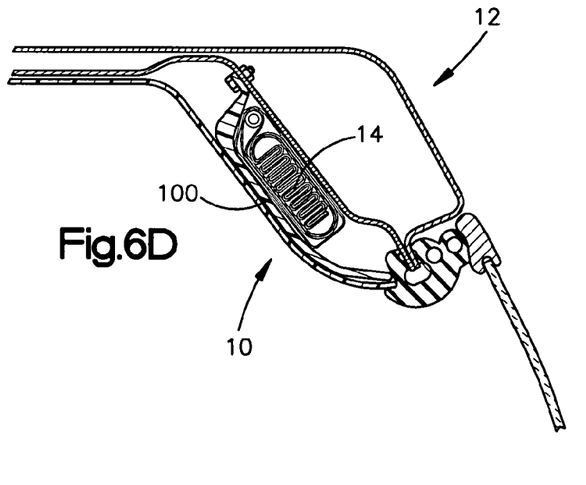

The inflatable curtain may be placed in the deflated and stored condition in a variety of manners. For example, as shown in FIG. 1B, the inflatable curtain 14 may be placed in the deflated and stored condition by folding the curtain in a back-and-forth manner to form what may be referred to as a "zigzag" fold or "fan-fold." In other examples, the inflatable curtain 14 may be placed in the deflated and stored condition by rolling the curtain in an outboard direction, as shown in FIG. 6A, or by rolling the curtain in an inboard direction, as shown in FIG. 6B. As further examples, the inflatable curtain 14 may be placed in the deflated and stored condition by a combination of rolling and folding the curtain, as shown in FIGS. 6C and 6D.

The apparatus 10 also includes one or more curtain deflectors 100 for helping to control deployment of the inflatable curtain 14. More specifically, the curtain deflectors 100 are configured to help control deployment such that the inflatable curtain 14, when deployed, will move an occupant's head that is positioned against the vehicle side structure 16 laterally away from the side structure. This is described in further detail below.

The apparatus 10 may include one or more inflatable curtains 14 inflatable between the side structure 16 and vehicle occupants. The apparatus 10 may also include one or more curtain deflectors 100 associated with each inflatable curtain 14. In the embodiment of FIGS. 1A-3B, the apparatus 10 includes two curtain deflectors 100 associated with a single inflatable curtain 14. In this configuration, one curtain deflector 100 corresponds to the first row of vehicle seating 60 and one curtain deflector corresponds to the second row of vehicle seating 62.

The curtain deflectors 100 are configured to extend along respective portions of the length of the inflatable curtain 14. The length of the curtain deflectors 100 and their positions in the vehicle 12 are selected to position the deflectors above a range of locations on the side structure 16 against which a normally seated occupant's head 150 and 170 may be positioned. This range of locations may vary depending on various factors, such as the range of forward, rearward, and tilt positions of the vehicle seating 60 and 62.

Figure 3A:
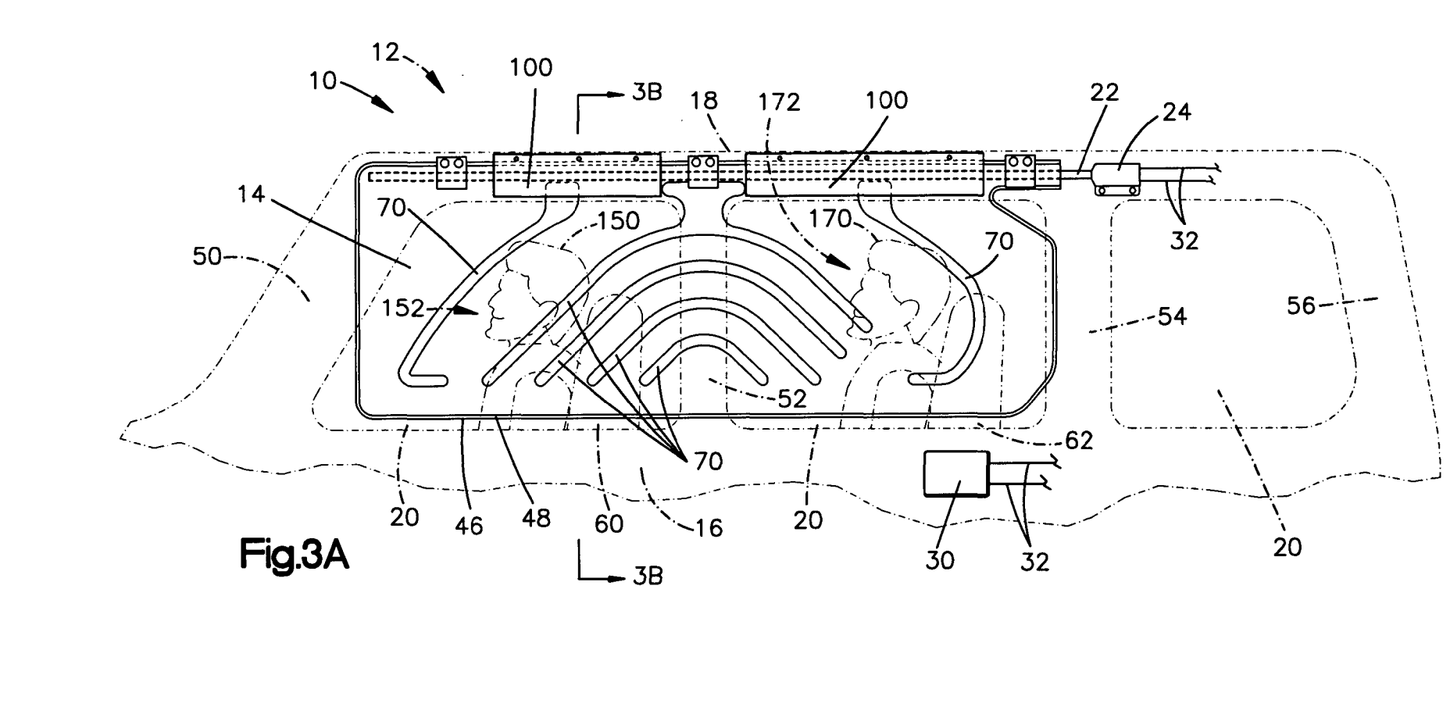
FIG. 3A is a schematic view of the apparatus of FIG. 1A in an inflated condition.

The inflatable curtain 14 may have any suitable construction. For example, as shown in FIG. 3A, the inflatable curtain 14 may include panels of material that are arranged in an overlying manner. Portions of the panels are secured together. For example, the panels are secured together along at least a portion of a perimeter 48 of the inflatable curtain 14 to form a perimeter connection 46 of the curtain. The perimeter connection 46 helps define an inflatable volume of the inflatable curtain 14. The perimeter connection 46 may be formed in a variety of manners, such as by weaving the panels as a single piece of material, stitching the panels together, or interconnecting the panels by ultrasonic welding, heat bonding, or adhesives.

The inflatable curtain 14 may also include interior connections 70 in which the overlying panels are secured together within the perimeter 48 of the curtain. The interior connections 70 form non-inflatable portions of the inflatable curtain 14 within the perimeter 48 of the curtain. The interior connections 70 also help define inflatable chambers of the inflatable curtain 14. The configuration of the interior connections 70, and thus the chambers, may vary depending on a variety of factors, such as the architecture of the vehicle 12, the position of the inflatable curtain 14 in the vehicle, and the desired extent or coverage of the curtain.

The panels are woven from a material, such as nylon yarn, and may be coated with a gas impermeable material, such as urethane, or laminated with a gas impermeable film. The inflatable curtain 14 thus may have a substantially gas-tight construction. Those skilled in the art will appreciate that alternative materials, such as polyester yarn, and alternatives coatings, such as silicone, may also be used to construct the inflatable curtain 14.

The vehicle 12 includes a sensor mechanism 30 (shown schematically in FIGS. 1A and 2A) for sensing a side impact to the vehicle 12 and/or a rollover of the vehicle 12. The sensor mechanism 30 actuates the inflator 24 in response to sensing a side impact or a vehicle rollover. In the event of a rollover of the vehicle 12 or a side impact to the vehicle for which inflation of the inflatable curtain 14 is desired, the sensor mechanism 30 provides an electrical signal over lead wires 32 to the inflator 24. The electrical signal causes the inflator 24 to be actuated in a known manner. The inflator 24 discharges fluid under pressure into the fill tube 22. The fill tube 22 directs the fluid into the inflatable curtain 14.

The inflatable curtain 14 inflates under the pressure of the inflation fluid from the inflator 24. The housing 26 opens and the inflatable curtain 14 inflates and unrolls in a direction away from the roof 18 in a downward direction as shown in the drawings and in a downward direction with respect to the direction of forward travel of the vehicle 12 into the inflated condition illustrated in FIGS. 3A and 3B.

The inflatable curtain 14, when inflated, extends along the side structure 16 of the vehicle 12 and is positioned between the side structure and any occupant of the vehicle. The inflatable curtain 14 extends between an A pillar 50 and a C pillar 54 of the vehicle 12 and overlies at least a portion of the A pillar, C pillar, and a B pillar 52 of the vehicle.

It will be recognized by those skilled in the art that the inflatable curtain may have alternative configurations. For example, in the illustrated embodiment, the inflatable curtain 14 extends between the A pillar 50 and the C pillar 54 of the vehicle 12. The inflatable curtain 14 could, however, extend between the A pillar 50 and the B pillar 52 only or between the B pillar and the C pillar 54 only. Also, the inflatable curtain 14 could extend between the A pillar 50 and a D pillar 56 of the vehicle. As another example, the configuration of the perimeter connection 46, connections 70, or both could differ from that shown in FIG. 3A. In this instance, the inflatable chambers of the curtain would differ from that shown in FIG. 3A.

Those skilled in the art will recognize that an occupant of the vehicle may be positioned against the vehicle side structure 16 at the time of an event for which inflation of the inflatable curtain 14 is desired. This is illustrated in FIGS. 1A and 1B. As shown in FIGS. 1A and 1B, the head 150 of a vehicle occupant 152 is positioned against the vehicle side structure 16. In particular, the occupant's head 150 is positioned against a side window 20 of the vehicle.

According to the present invention, the curtain deflectors 100 are configured and arranged in the vehicle 12 to cause the inflatable curtain 14 to inflate and deploy between the vehicle occupant 152 and the vehicle side structure 16 when the occupant's head 150 is positioned against the side structure at the time of inflation. In particular, the curtain deflectors 100 force the inflatable curtain 14 to inflate and deploy toward the side structure 16 in a direction or trajectory such that the curtain engages the side structure above the location on the side structure where the occupant's head is resting.

Since occupant size can vary widely, it will be appreciated that the configuration of the curtain deflectors 100 may be determined in accordance with statistical occupant size measurements. For example, the curtain deflectors 100 may be configured to direct the inflatable curtain 14 to engage the side structure above the location on the side structure where a $95^{th}$ percentile occupant's head is resting. A $95^{th}$ percentile occupant is an occupant that has a size greater than or equal to 95% of the population, such as a large male. For example, a $95^{th}$ percentile occupant may be 6'3" tall and weigh 215 pounds.

Referring to FIG. 1B, in the deflated and stored condition, the inflatable curtain 14 has an angled orientation relative to the vehicle side structure 16 and relative to a vertical direction in the vehicle 12. In the embodiment illustrated in FIG. 1B, the inflatable curtain 14 is oriented along a centerline 160 that extends transverse to the vehicle side structure 16 and to a vertical direction indicated generally by the vertical line labeled 162. For example, the angle between the centerline 160 and the vertical line 162 may be about 15-60 degrees. In the embodiment of FIG. 1B, the angle between the centerline 160 and the vertical line 162 is about forty degrees. The centerline 160 could, however, extend at some other angle relative to the vertical line 162. The angle between the centerline 160 and the vertical line 162 may depend on various factors, such as vehicle space limitations and the architecture of the vehicle 12.

The fill tube 22 may be positioned to direct inflation fluid to be discharged into the inflatable curtain 14 in a direction about parallel to the centerline 160. This helps direct the inflatable curtain 14 to inflate and deploy in a direction parallel to the centerline 160, generally downward away from the vehicle roof 18 and toward the side structure 16. Absent the curtain deflector 100, the inflatable curtain 14 would tend to deploy parallel to the centerline 160 into engagement with the occupant's head 150 at a location 164 spaced inboard from the location 166 where the occupant's head engages the side structure 16. Because of this, the curtain deflector 100 helps prevent the inflatable curtain 14 from inflating inboard of the occupant's head 150.

Since the inflatable curtain 14 inflates and deploys into engagement with the curtain deflector 100, the deflector has to be sufficiently strong and rigid to withstand the forces exerted by the curtain during deployment and to deflect the curtain in the appropriate direction. This is not to say that the curtain deflector 100 is completely without deflection under the forces exerted by the inflatable curtain 14 during deployment. Rather, the curtain deflector 100 may be configured to allow deflection only to an extent that the desired deployment direction or trajectory of the inflatable curtain 14 is maintained.

Figure 4:
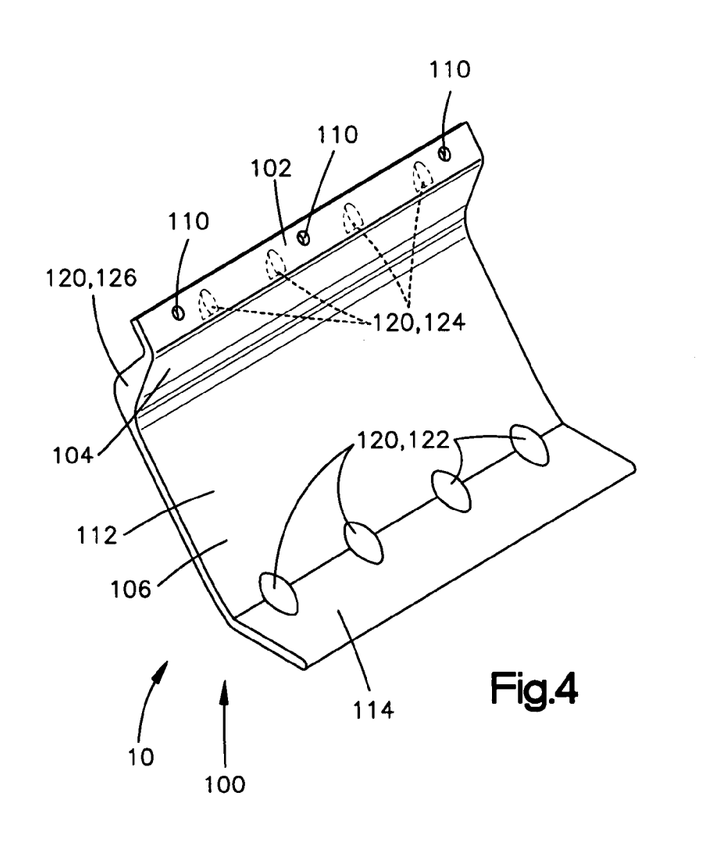
FIG. 4 is a perspective view of a portion of the apparatus of FIGS. 1A-3B.
Figure 5:
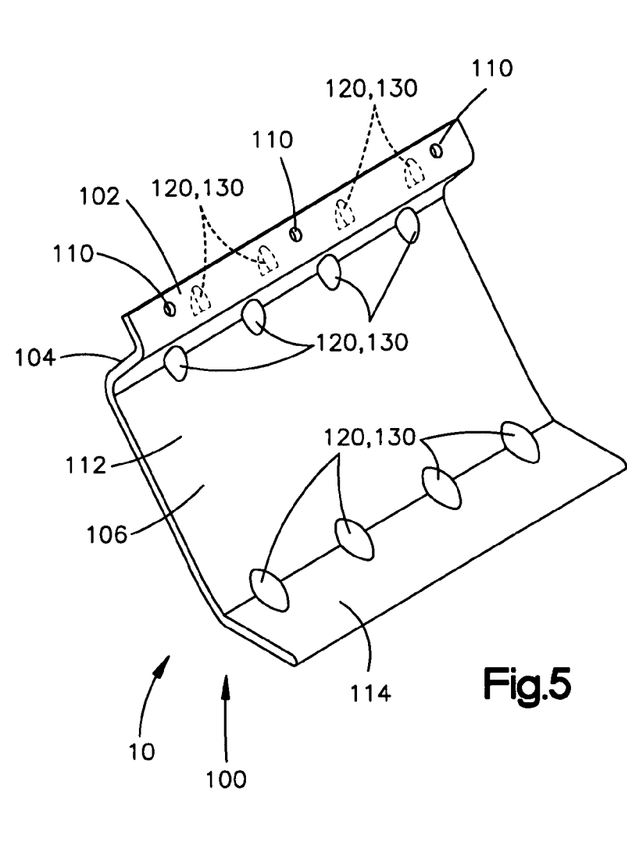
FIG. 5 is a perspective view of an alternative construction of the portion of FIG. 4.

The curtain deflector 100 may have various constructions. Two constructions for the curtain deflector 100 are illustrated in FIGS. 4 and 5. The constructions of the curtain deflector 100 in FIGS. 4 and 5 are similar to each other, the main difference being that the deflector of FIG. 4 has a plastic construction, whereas the deflector of FIG. 5 has a metal construction. The curtain deflector 100 could, however, be constructed of any material or combination of materials capable of providing the requisite strength and rigidity. For example, the curtain deflector 100 may have a plastic construction reinforced with metal. This can be achieved, for example, by insert molding metal reinforcements in a plastic curtain deflector 100.

Referring to FIG. 4, the curtain deflector 100 is constructed of an elastomeric material, such as plastic. Examples of such plastic materials are thermoplastic elastomers (TPE) and thermoplastic polyolefin elastomers (TPO). Any suitable elastomeric material can be used to construct the curtain deflector 100. The curtain deflector 100 of FIG. 4 can be formed, for example, by injection molding.

The curtain deflector 100 includes a connector flange 102, a support portion 104, and a deflecting portion 106. The connector flange 102 is formed by an edge portion of the curtain deflector 100 and includes apertures 110 spaced along its length. The apertures 110 are for receiving fasteners 182 (see, for example, FIG. 1B) for connecting the curtain deflector 100 to the vehicle 12.

The support portion 104 extends transversely between the connector flange 102 and the deflecting portion 106. The deflecting portion 106 has a first portion 112 that extends away from the support portion 104 and a terminal second portion 114 that extends transversely away from the first portion.

As shown in FIG. 4, the curtain deflector 100 may include reinforcing portions 120 for increasing the strength and rigidity of certain portions of the deflector. The inclusion of the reinforcing portions 120 depends on various factors, such as the type of material used to construct the curtain deflector 100 and the desired strength or rigidity of the deflector. As described below, the reinforcing portions 120 may include ribs molded into the curtain deflector 100, portions of the curtain deflector 100 that are molded with an increased cross-sectional area, or both of the foregoing.

In the embodiment of FIG. 4, the curtain deflector 100 includes reinforcing portions 120 in the form of ribs 122 that extend between the first and second portions 112 and 114 of the deflecting portion 106. The ribs 122 help increase the rigidity of the deflecting portion 106 and, more specifically, help increase the rigidity at and near the intersection between the first and second portions 112 and 114 of the deflecting portion 106. The ribs 122 help increase the resistance to relative bending and deflection between the first and second portions 112 and 114.

The curtain deflector 100 also includes reinforcing portions 120 in the form of ribs 124 that extend between the connector flange 102 and support portion 104. The ribs 124 help increase the rigidity at and near the intersection between the connector flange 102 and support portion 104. The ribs 124 thus help increase the resistance to relative bending and deflection between the connector flange 102 and support portion 104.

The curtain deflector 100 also includes a reinforcing portion 120 in the form of a portion 126 in the area of the intersection of the support portion 104 and the deflecting portion 106 that has a thickness or cross-sectional area that is increased from the thickness or cross-sectional area of the remainder of the deflector. The increased cross-sectional area of the portion 126 helps increase the rigidity at and near the intersection between the support portion 104 and deflecting portion 106. The portion 126 thus helps increase the resistance to relative bending and deflection between the support portion 104 and deflecting portion 106.

The configuration of the reinforcing portions 120 and the construction of the remainder of the curtain deflector 100 are selected or tailored to have a strength and rigidity sufficient to deflect or otherwise direct the inflatable curtain 14 to deploy in the desired direction or trajectory. The size and number of the ribs 122 and 124, the cross-sectional area of the portion 126, the thickness of the portions 102, 104, 106, and the material used to construct the curtain deflector 100 each may have an effect on how the deflector performs during deployment of the inflatable curtain 14. By selecting an appropriate combination of these features, the curtain deflector 100 can be configured to permit an amount of deflection sufficient to place the deflector at a position suited to direct the inflatable curtain 14 to deploy in the desired direction or trajectory.

For example, in the embodiment illustrated in FIG. 4, the ribs 124 may be configured to limit substantially or prevent deflection between the connector flange 102 and support portion 104. Similarly, the ribs 122 may be configured to limit substantially or prevent deflection between the first and second portions 112 and 114 of the deflecting portion 106. In this configuration, deflection may occur between the support portion 104 and deflecting portion 106 at the portion 126. Deflection may also occur as a result of bending at the first portion 112, at the second portion 114, or both. In this instance, deflection can thus be controlled by selecting or tailoring the cross-sectional area of the portion 126 and by selecting or tailoring the thickness of the first and second portions 112 and 114.

In an alternative embodiment of the present invention shown in FIG. 5, the curtain deflector 100 is constructed of metal. Examples of suitable metals are steel and aluminum. Any suitable metal can be used to construct the curtain deflector 100. The curtain deflector 100 of FIG. 5 can be formed, for example, by stamping the deflector from a sheet of metal.

The curtain deflector 100 of FIG. 5 may be similar or identical to the deflector of FIG. 4, with the exception that the connector flange 102, support portion 104, and deflecting portion 106 are generally equal in thickness. This is because the metal sheet from which the curtain deflector 100 is stamped typically has a uniform thickness. As a result, the thickness of the portions 102, 104, and 106 may not be readily tailored as they are in the plastic construction of FIG. 4.

Accordingly, the reinforcing portions 120 of the curtain deflector 100 of FIG. 5 include ribs 130 that extend between the connector flange 102 and the support portion 104. The ribs 130 in FIG. 5 also perform the function of the variable cross-sectional area of the portion 126 of the support portion 104 of FIG. 4. The ribs 130 can be configured and arranged to provide the desired degree of strength and rigidity in the area of the intersection between the support portion 104 and deflecting portion 106 of the curtain deflector 100 of FIG. 5.

In the embodiment of FIG. 5, the configuration of the reinforcing portions 120 and the construction of the remainder of the curtain deflector 100 are selected or tailored to have a strength and rigidity sufficient to deflect or otherwise direct the inflatable curtain 14 to deploy in the desired direction or trajectory. The size and number of the ribs 130, the thickness of the portions 102, 104, 106, and the material used to construct the curtain deflector 100 each may have an effect on how the deflector performs during deployment of the inflatable curtain 14. By selecting an appropriate combination of these features, the curtain deflector 100 can be configured to permit an amount of deflection sufficient to place the deflector at a position suited to direct the inflatable curtain 14 to deploy in the desired direction or trajectory.

For example, in the embodiment illustrated in FIG. 5, the ribs 130 may be configured to limit substantially or prevent deflection between the connector flange 102 and support portion 104. Similarly, the ribs 130 may be configured to limit substantially or prevent deflection between the first and second portions 112 and 114 of the deflecting portion 106. In this configuration, deflection may occur between the support portion 104 and deflecting portion 106. Deflection may also occur as a result of bending at the first portion 112, at the second portion 114, or both. In this instance, deflection can thus be controlled by tailoring the size, number and location of the ribs 130 and by tailoring the thickness of the first and second portions 112 and 114.

The performance of the curtain deflectors 100 of FIGS. 4 and 5 may also depend on the configuration of the deflecting portion 106. The relative sizes of the first and second portions 112 and 114 and the angle at which they extend relative to each other can be selected to direct the inflatable curtain 14 to deploy in the desired direction. The degree of deflection required of the curtain deflector 100 may depend on a variety of factors.

For example, the first portion 112 of the deflecting portion 106 may need to be a certain length and the second portion 114 may have to extend from the first portion at a certain angle in order deploy the inflatable curtain 14 in the desired direction. This may be the case, for example, where the inflatable curtain 14 needs to deploy initially downward a given distance in order to clear structure of the vehicle 12, such as a roof rail 180, and then outboard toward a target location 166 on the vehicle side structure 16.

To achieve this, the length of the first portion 112 could be configured to be sufficient to allow the inflatable curtain 14 to inflate initially downward to clear the roof rail. The angle between the first and second portions 112 and 114 is selected to direct the inflatable curtain 14 toward the target location on the side structure. This angle is selected to direct the inflatable curtain 14 toward the target location 166 on the side structure 16 while the deflector 100 is deflected under the load of the inflating curtain. The curtain deflector 100 thus directs the inflatable curtain 14 in a direction indicated generally by the line labeled 212 in FIG. 2B toward the target location 166.

FIGS. 1A-3B illustrate the configuration and operation of the curtain deflector 100 in the vehicle. In FIGS. 1A-3B, the illustrated curtain deflector 100 has the configuration of FIG. 4. Alternatively, the curtain deflector 100 of FIG. 5 could be implemented in the vehicle of FIGS. 1A-3B.

Referring to FIGS. 1A and 1B, the apparatus 10 is illustrated prior to actuation of the inflator 24. The front seat occupant 152 is positioned in the front seat 60 of the vehicle 12 and the rear seat occupant 172 is positioned in the rear seat 62 of the vehicle. The heads 150 and 170 of the occupants 152 and 172 are positioned against the side windows 20 adjacent the front and rear seats 60 and 62, respectively. The occupant's heads 150 and 170 could be positioned against other parts of the side structure 16, such as the B pillar 52 or C pillar 54, respectively. Although not shown, the position of the rear seat occupant 172 may be similar or identical to the position of the front seat occupant 152 shown in FIG. 1B.

The apparatus 10 is illustrated in FIGS. 1A and 1B in a stored position in which the inflatable curtain 14 is placed in the housing 26, forming a curtain package 28 that is installed in the vehicle 12. The curtain package 28 is connected to the vehicle 12 by means 184, such as brackets. In the stored position, the curtain package 28 extends along an intersection of the side structure 16 and the vehicle roof 18 above the side windows 20 and adjacent a roof rail 180 of the vehicle 12.

Referring to FIG. 1B, the curtain deflector 100 is connected to the vehicle 12 by means 182, such as bolts, that extend through the openings 110 (see FIG. 4) in the connector flange 102 of the deflector. In the installed condition of FIGS. 1A and 1B, the curtain package 28 is positioned in a space 190 defined between the roof rail 180 and the curtain deflector 100. The deflecting portion 106 of the curtain deflector 100 is positioned such that the first portion 112 abuts the curtain package 28. The second portion 114 extends in a direction outboard of the vehicle 12 beneath the curtain package 28 and terminates adjacent the roof rail 180.

The vehicle 12 includes a headliner 200 that conceals the apparatus 10 in the stored condition. The headliner 200 underlies the vehicle roof 18 and terminates adjacent the roof rail 180. In the embodiment illustrated in FIGS. 1A-3B, the headliner 200 has a terminal end portion 202 that engages a bulb seal 204, which helps form a weatherproof seal between the side structure 16 and a side door 206 of the vehicle 12. The headliner 200 could, however, be supported by an alternative structure, such as a trim piece (not shown) of the vehicle 12.

Figure 2A:
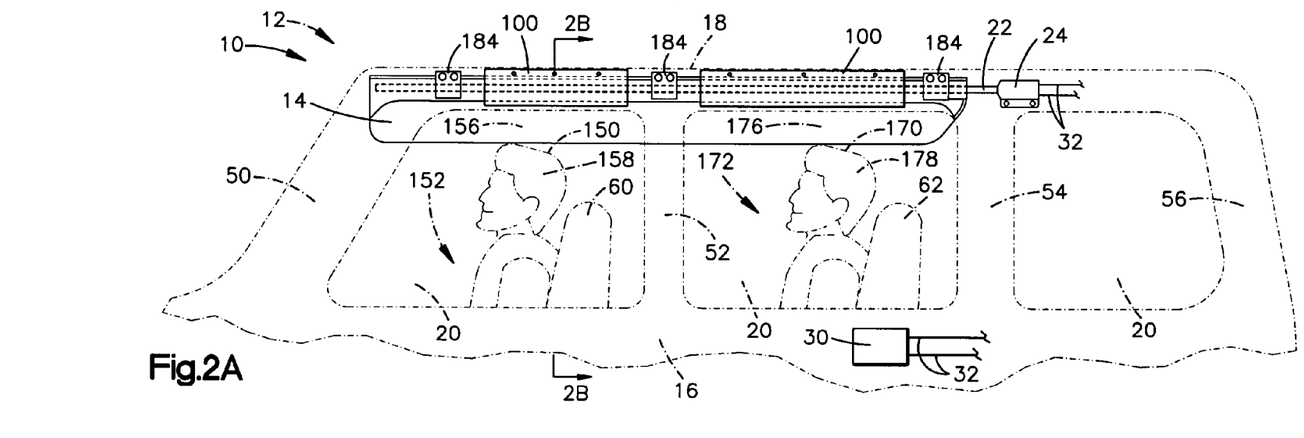
FIG. 2A is a schematic view of the apparatus of FIG. 1A during inflation.
Figure 2B:
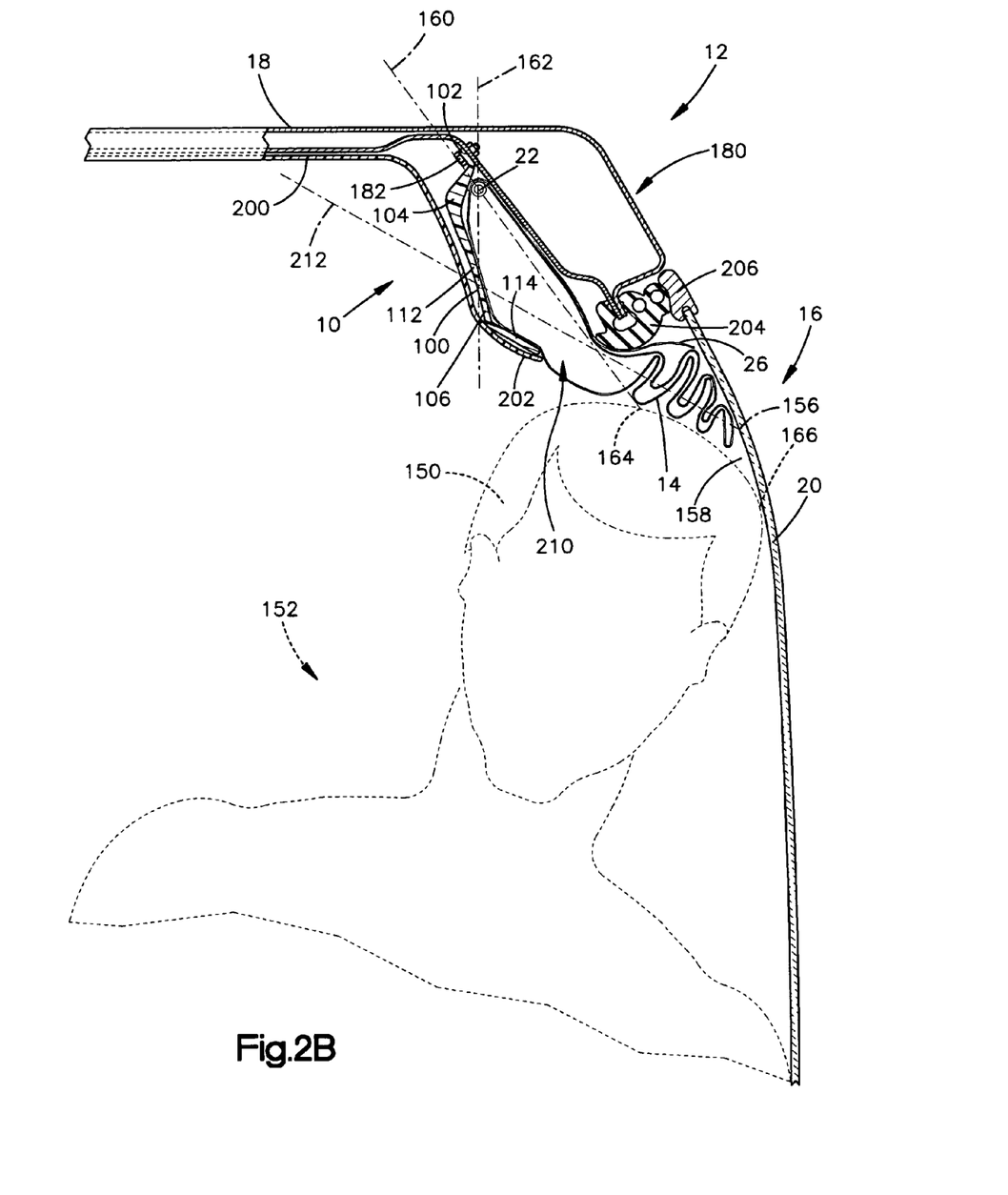
FIG. 2B is a sectional view taken generally along line 2B-2B in FIG. 2A.

Referring to FIGS. 2A and 2B, upon actuation of the inflator 24, the housing 26 opens and the inflatable curtain begins to inflate in the downward direction away from the vehicle roof 18. In the embodiment of FIGS. 3A-5B, the downward direction extends generally along the centerline 160 such that the inflatable curtain 14 inflates at an angle downward and outboard towards the vehicle side structure 16. The inflatable curtain 14 could, however, inflate at some other angle in the vehicle 12 depending on the orientation of the curtain in the vehicle.

As the inflatable curtain 14 inflates and deploys, it exerts forces on the curtain deflector 100 that cause the deflector to bend or otherwise deflect away from the stored position of FIG. 1B. This is shown in FIGS. 2A and 2B. The inflating curtain 14 causes the headliner to disengage from the bulb seal 204 and move along with the curtain deflector 100 toward the position shown in FIG. 2B. This creates an opening 210 through which the inflatable curtain 14 is deployed.

As the curtain deflector 100 deflects under the deployment forces exerted by the inflating curtain 14, the deflector eventually reaches a deployment position in which the resilience of the deflector overcomes the deployment forces of the curtain. The curtain deflector 100, when in the deployment position, helps control the direction or trajectory along which the inflatable curtain 14 deploys. According to the present invention, through the construction of the curtain deflector 100, the deployment position of the curtain deflector 100 is selected so that the inflatable curtain 14 is directed toward locations 156 and 176 on the side structure 16 adjacent the front and rear seats 60 and 62, respectively. These locations 156 and 176 may, for example, be locations on the side structure 16 above which the head of a $95^{th}$ percentile occupant of the front seat 60 or rear seat 62, respectively, may normally rest. Once the curtain 14 strikes the side structure 16 and curtain continues to inflate, the curtain follows the side structure (e.g., the side window 20) and comes into contact with the front seat occupant's head 150 and the rear seat occupant's head 170, as shown in FIGS. 2A and 2B.

As the inflatable curtain 14 continues to inflate, the curtain engages the occupants' heads 150 and 170 and is urged and wedges into spaces 158 and 178 between the occupants' heads and the side structure 16. As shown in FIG. 2B, the space 158 has a generally tapered configuration and is positioned above the location 166 where the occupant's head 150 engages the side window 20. The space 158 with a width that tapers or narrows from wide to narrow toward the location 166 where the occupant's head 150 engages the side window 20. The location 178 (not shown in cross-section) has a similar or identical configuration. Forcing or wedging of the inflatable curtain 14 into the spaces 158 and 178 between the occupants' heads 150 and 170 and the side structure 16 helps the curtain resist movement away from the side structure and thus helps to prevent the curtain from inflating inboard of the occupants 152 and 172.

Figure 3B:
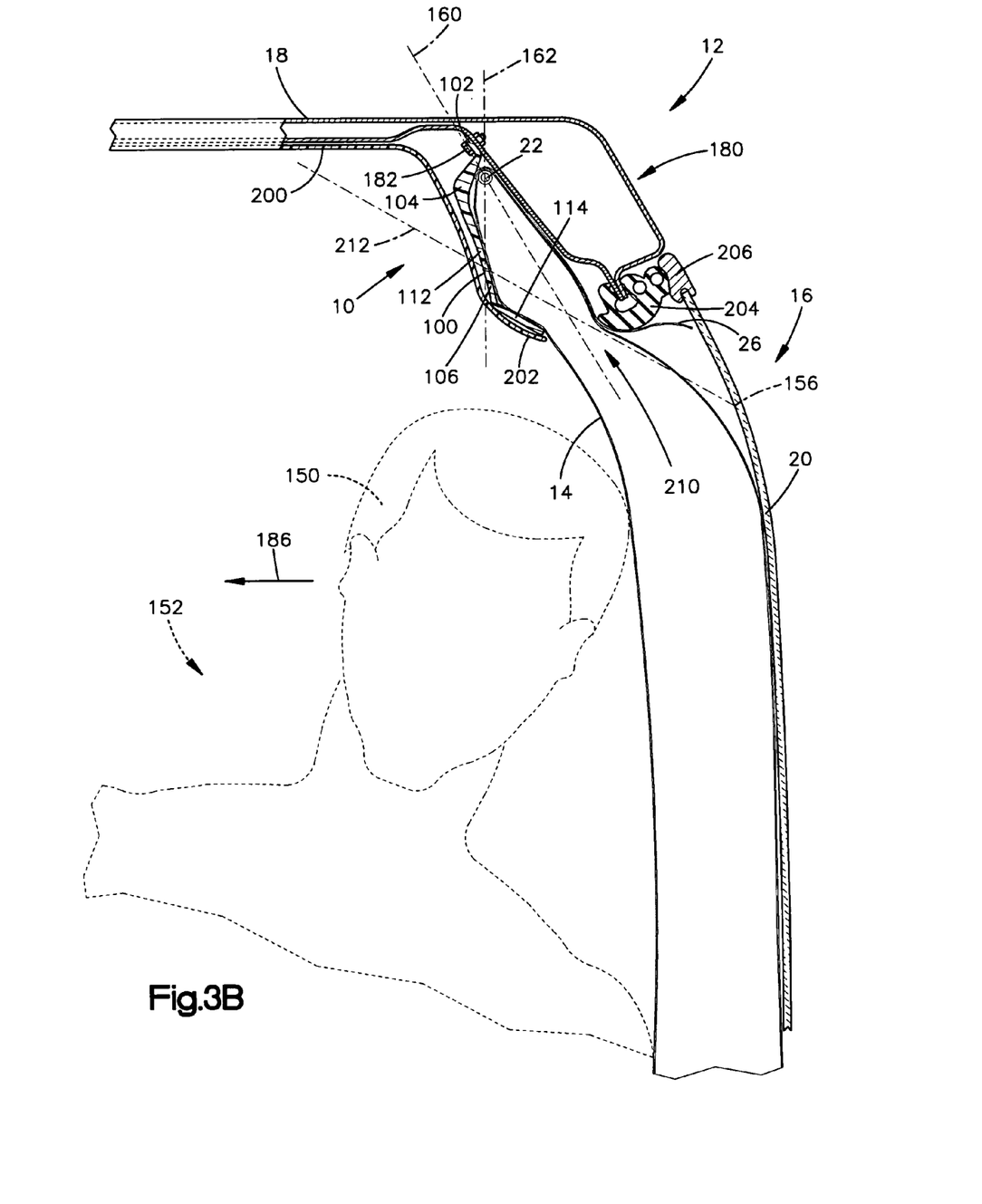
FIG. 3B is a sectional view taken generally along line 3B-3B in FIG. 3A.

Referring to FIGS. 3A and 3B, as the inflatable curtain 14 continues to inflate, the curtain continues to move in the downward direction and is forced between the occupants 152 and 172 and the vehicle side structure 16. Continued inflation moves the occupants 152 and 172 away from the side structure 16 as indicated by the arrow 186 in FIG. 3B. The inflatable curtain 14 is inflated to a deployed position between the front and rear seat occupants 152 and 172 and the vehicle side structure 16.

The inflatable curtain 14, when inflated in the deployed position of FIGS. 3A and 3B, helps to protect the front and rear seat occupants 152 and 172 in the event of a vehicle rollover or a side impact to the vehicle 12. The inflatable curtain 14, when inflated, helps absorb the energy of impacts with the inflatable curtain and helps distribute the impact energy over a large area of the curtain.

From the above, it will be appreciated that the construction of the curtain deflector 100 depends on the deployment force exerted on the deflector by the inflatable curtain 14 during deployment. The deployment force may vary. As an example, during inflation, the inflatable curtain 14 may exert a deployment force of 200 or more pounds force on the curtain deflector 100. Factors that affect the deployment force include the volume of inflation fluid entering the inflatable curtain 14 and the velocity at which the inflation fluid enters the curtain.

According to the present invention, the curtain deflector 100 is configured to deflect or bend under the deployment force to permit deployment of the inflatable curtain 14. The curtain deflector 100 is also configured to cease deflection or bending when the deflector reaches the deployment position.

For purposes of this example, assume that, upon deployment of the inflatable curtain 14, the deployment force is exerted on the curtain deflector 100 along line 160 in FIGS. 1B and 2B. This direction may coincide with the direction in which inflation fluid is directed into the inflatable curtain 14 from the fill tube 22.

Those skilled in the art will appreciate that the deployment force can be broken down into component forces acting on the curtain deflector 100. In the present example, the deployment force would include a normal component force acting normal to the deflecting portion 106 where the line 160 intersects the second portion 114 and a component force acting perpendicular to the normal component. The normal component force acts on the curtain deflector 100 to cause the deflector to deflect or bend from the stored position of FIG. 1B toward the deployed position of FIG. 3B.

As the curtain deflector 100 deflects or bends under the deployment force, the angle at which the deployment force acts on the deflector decreases, which reduces the normal component force acting on the deflector. When the curtain deflector 100 reaches a position where the strength or rigidity of the deflector overcomes the normal component of the deployment force, further deflection or bending ceases. This leaves the curtain deflector 100 at the deployment position and, as a result, the deflector directs the inflatable curtain 14 toward the target location 156 on the vehicle side structure 16.

According to the present invention, the curtain deflector 100 is configured such that the deployment force of the inflating curtain 14 is overcome when the deflector reaches the desired deployment position for directing the curtain toward the target location. This configured can be achieved through material selection (e.g., material type, thickness, or cross-sectional area) and by tailoring the reinforcing portions 120 of the curtain deflector 100, as described above. The configuration of the curtain deflector 100 can be determined through calculations, testing, or a combination thereof.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for helping to protect an occupant of a vehicle that has a side structure and a roof, said apparatus comprising:
 a vehicle occupant protection device having a centerline and being deployable away from the vehicle roof, and a deflector for deflecting the protection device to deploy outboard of the centerline toward the side structure in a direction such that the protection device is configured to engage an occupant's head and configured to move the occupant's head laterally away from the side structure, wherein the protection device prior to deployment is packaged in a space defined between the deflector and the roof.

2. The apparatus recited in claim 1, wherein said protection device is deployable between the side structure of the vehicle and the occupant's head.

3. The apparatus recited in claim 1, wherein said deflector is for directing said protection device to deploy toward a target location on the vehicle side structure, said target location configured to be selected to be above a 95$^{th}$ percentile vehicle occupant's head positioned against the side structure.

4. The apparatus recited in claim 3, wherein said deflector is adapted to overcome deployment forces exerted on said deflector by said protection device when said deflector reaches a deployment position.

5. The apparatus recited in claim 4, wherein said deployment forces have a magnitude of 200 or more pounds force.

6. The apparatus recited in claim 3, wherein said deflector comprises reinforcing portions constructed and arranged to help control deflection of said deflector under deployment forces exerted on said deflector by said protection device to help prevent said deflector from deflecting beyond a deployment position.

7. The apparatus recited in claim 3, wherein said target location is selected such that said protection device is configured to deploy into a tapered space between the occupant's head and the side structure above a location where the occupant's head is engaging the side structure, the protection device being configured such that continued deployment of said protection device forces said protection device between the occupant's head and the side structure.

8. The apparatus recited in claim 1, wherein said protection device comprises an inflatable curtain.

9. Apparatus for helping to protect an occupant of a vehicle that has a side structure and a roof, said apparatus comprising:
   a vehicle occupant protection device having a centerline and being deployable away from the vehicle roof and deflected outboard of the centerline toward the side structure in a direction such that the protection device is configured to engage an occupant's head and configured to move the occupant's head laterally away from the side structure; and
   a deflector for directing said protection device to deploy toward a target location on the vehicle side structure, said target location being configured to be selected to be above the vehicle occupant's head positioned against the side structure, the vehicle occupant being of a predetermined size of a 95$^{th}$ percentile vehicle occupant,
   wherein said deflector has a stored position prior to deployment of said protection device, said protection device when deployed exerting a deployment force on said deflector that urges said deflector to deflect away from said stored position to a deployment position in which said deflector is positioned for directing said protection device to deploy toward said target location on the vehicle side structure.

10. Apparatus for helping to protect an occupant of a vehicle that has a side structure and a roof, said apparatus comprising:
    a vehicle occupant protection device having a centerline and being deployable away from the vehicle roof and deflected outboard of the centerline toward the side structure in a direction such that the protection device is configured to engage the occupant's head and configured to move an occupant's head laterally away from the side structure; and
    a deflector for directing said protection device to deploy toward a target location on the vehicle side structure, said target location being configured to be selected to be above the vehicle occupant's head positioned against the side structure, the vehicle occupant being of a predetermined size of a 95$^{th}$ percentile vehicle occupant,
    wherein said deflector comprises a deflecting portion, said deflecting portion comprising:
    a first portion constructed and arranged to permit said protection device to deploy in a first direction in order to clear vehicle structure; and
    a second portion constructed and arranged to direct said protection device in a second direction different than said first direction toward the target location.

11. The apparatus recited in claim 10, wherein said deflector further comprises:
    a connector portion connectable to the vehicle to help connect said deflector to the vehicle;
    a support portion for connecting said deflecting portion to said connector portion; and
    reinforcing portions for helping to limit deflection of said deflector in response to deployment forces exerted by deployment of said protection device so that said deflector directs said protection device toward the target location.

12. The apparatus recited in claim 11, wherein said reinforcing portions are constructed and arranged to reinforce the interface between at least one of:
    said connector portion and said support portion;
    said support portion and said deflecting portion; and
    said first and second portions of said deflecting portion.

13. The apparatus recited in claim 11, wherein said reinforcing portions comprise at least one of ribs and portions of said deflector having an increased cross-sectional area.

14. Apparatus for helping to protect an occupant of a vehicle that has a side structure and a roof, said apparatus comprising:
    an inflatable vehicle occupant protection device having a centerline and being inflatable to deploy away from the vehicle roof;
    an inflation fluid source for providing inflation fluid for inflating said protection device; and
    a deflector for directing said protection device to deploy outboard of the centerline and toward a target location on the vehicle side structure, said target location being selected such that the protection device is configured to engage an occupant's head and configured to move the occupant's head laterally away from the side structure to allow said protection device to inflate between the side structure of the vehicle and the occupant's head, wherein the protection device prior to deployment is packaged in a space defined between the deflector and the roof.

15. The apparatus recited in claim 14, wherein said target location is configured to be selected to be above a 95$^{th}$ percentile vehicle occupant's head positioned against the side structure.

16. The apparatus recited in claim 14, wherein said target location is selected such that said protection device is configured to deploy into a tapered space between the occupant's head and the side structure above a location where the occupant's head is engaging the side structure, continued deployment of said protection device forces said protection device between the occupant's head and the side structure.

17. The apparatus recited in claim 14, further comprising a fill tube for directing inflation fluid from said inflation fluid source into said protection device, said fill tube directing inflation fluid into said protection device in a direction different than the direction toward the vehicle side structure that said deflector directs said protection device.

18. The apparatus recited in claim 14, further comprising a housing for storing said protection device prior to deployment, said housing being separate from said deflector.

19. The apparatus recited in claim 14, wherein said deflector is configured to extend along a portion of the length of said protection device above locations on the side structure against which a normally seated occupant's head may be positioned.

20. Apparatus for helping to protect an occupant of a vehicle that has a side structure and a roof, said apparatus comprising:

an inflatable vehicle occupant protection device having a centerline and being inflatable to deploy away from the vehicle roof;

an inflation fluid source for providing inflation fluid for inflating said protection device; and a deflector for directing said protection device to deploy outboard of the centerline and toward a target location on the vehicle side structure, said target location being selected such that the protection device is configured to engage an occupant's head and configured to move the occupant's head laterally away from the side structure to allow said protection device to inflate between the side structure of the vehicle and the occupant's head, wherein said deflector comprises:

a connector portion connectable to the vehicle to help connect said deflector to the vehicle;

a deflecting portion for directing said protection device to deploy toward the vehicle side structure;

a support portion for connecting said deflecting portion to said connector portion; and reinforcing portions for helping to limit deflection of said connector portion, deflecting portion, and support portion in response to deployment forces exerted on said deflector by said protection device.

21. The apparatus recited in claim 20, wherein said deflecting portion comprises:

a first portion constructed and arranged to permit said protection device to deploy in a first direction in order to clear vehicle structure; and a second portion constructed and arranged to direct said protection device in a second direction different than said first direction toward the target location.

22. The apparatus recited in claim 20, wherein said reinforcing portions comprise at least one of ribs and portions of said deflector having an increased cross-sectional area.

23. Apparatus for helping to protect an occupant of a vehicle that has a side structure and a roof, said apparatus comprising:

an inflatable vehicle occupant protection device having a centerline and being inflatable to deploy away from the vehicle roof;

an inflation fluid source for providing inflation fluid for inflating said protection device; and a deflector for directing said protection device to deploy outboard of the centerline and toward a target location on the vehicle side structure, said deflector having a stored position prior to deployment of said protection device, said protection device while inflating exerting a deployment force on said deflector that urges said deflector to deflect away from said stored position to a deployment position in which said deflector is positioned for directing said protection device to deploy toward said target location on the vehicle side structure, said target location being selected such that the protection device is configured to engage an occupant's head and configured to move the occupant's head laterally away from the side structure to allow said protection device to inflate between the side structure of the vehicle and the occupant's head.

24. Apparatus for helping to protect an occupant of a vehicle that has a side structure and a roof, said apparatus comprising:

an inflatable vehicle occupant protection device having a centerline and being inflatable to deploy away from the vehicle roof;

an inflation fluid source for providing inflation fluid for inflating said protection device; and a deflector for directing said protection device to deploy outboard of the centerline and toward a target location on the vehicle side structure, said target location being selected such that the protection device is configured to engage an occupant's head and configured to move the occupant's head laterally away from the side structure to allow said protection device to inflate between the side structure of the vehicle and the occupant's head, wherein said deflector comprises reinforcing portions constructed and arranged to control deflection of said deflector under deployment forces exerted by said protection device to help prevent said deflector from deflecting beyond a position at which said deflector directs said protection device to deploy toward said target location.

25. The apparatus recited in claim 24, wherein said deployment forces have a magnitude of 200 or more pounds force.

* * * * *